Figures 1, 2, 3, 4:
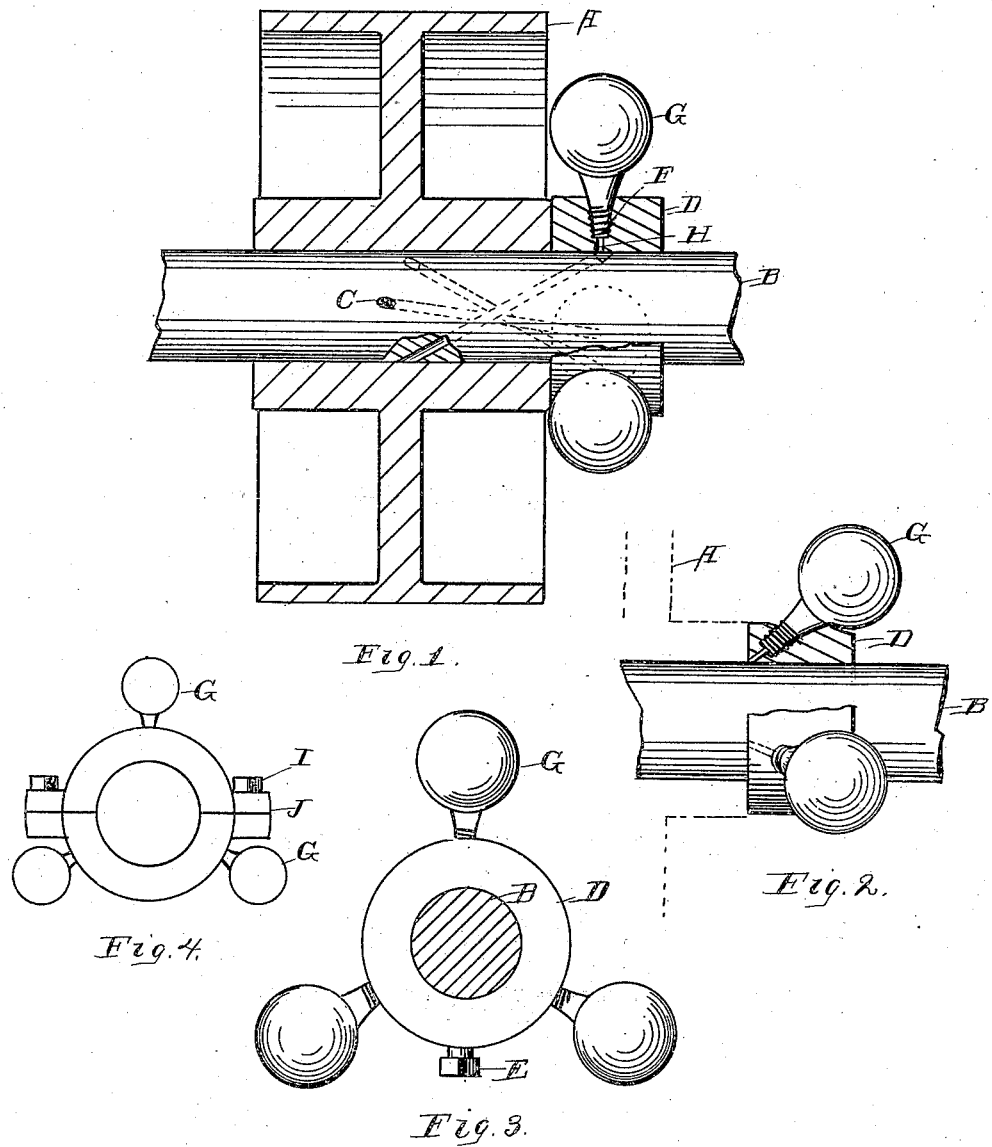

(No Model.)

W. J. ORMSBY.
LOOSE PULLEY LUBRICATOR.

No. 312,887. Patented Feb. 24, 1885.

WITNESSES:
Robert Kirk
C. D. Zerbe

INVENTOR:
William J. Ormsby
By J. S. Zerbe
Attorney.

UNITED STATES PATENT OFFICE.

WILLIAM J. ORMSBY, OF CINCINNATI, OHIO.

LOOSE-PULLEY LUBRICATOR.

SPECIFICATION forming part of Letters Patent No. 312,887, dated February 24, 1885.

Application filed October 20, 1884. (No model.)

*To all whom it may concern:*

Be it known that I, WILLIAM J. ORMSBY, of Cincinnati, in the county of Hamilton and State of Ohio, have invented a new and useful Improvement in Loose-Pulley Lubricators, which improvement is fully set forth in the following specification and accompanying drawings, in which—

Figure 1 is a transverse vertical central section of my improved loose-pulley lubricator. Fig. 2 is a side view, partly in section, of a sectional view of Fig. 2, and Fig. 4 a side view modification of the same; Fig. 3, a transverse of the collar as formed in sections.

The present invention relates to an improvement in loose-pulley lubricators, in which the principal novelty consists in providing an adjustable collar having therein a series of oilers communicating inwardly by means of openings with a series of veins extending through the shaft, and provided with outlets on the shaft beneath the loose pulley, all of which will now be set forth in detail.

In the accompanying drawings, A is a pulley, and B a shaft, formed in any ordinary manner. The shaft B is provided with a series of veins, C, somewhat longitudinal through the shaft, and triangularly disposed relative to each other.

Upon the shaft laterally from the pulley A, I provide a collar, D, adjustable upon the shaft by means of a set-screw, E. Within this collar D, I provide a series of threaded openings, F, preferably three in number, and triangularly disposed. Within these openings F, I provide oiling-receptacles G, designed to have communication through openings H with the veins C, extending through the shaft. The inner ends of the veins C are designed to open on the surface of the shaft beneath the loose pulley A, placed opposite the collar D, so that as the pulley A is revolved upon the said shaft D the oil from the receptacle G may be conveyed through the veins C, and thus oil the pulley A upon the shaft.

Fig. 2 shows a modification of Fig. 1, in which I dispense with the veins C, and in their stead provide the opening F in the collar, somewhat at an angle, as shown in the drawings, so that the opening at the inner end of the collar, through which the oil flows to the pulley, may come in direct contact with the pulley-hub upon the shaft without passing through the veins C, as shown in Fig. 1. In many cases I find this to answer the purpose without going to the expense of providing veins.

Fig. 4 shows a view of the collar and oilers, in which the said collar is formed in halves and secured together by means of bolts I through the wings J. This form is designed to be used in cases where the ordinary collar cannot be placed upon the shaft.

What I claim is—

1. In a loose-pulley lubricator, the independent collar secured in position by means of a set-screw, provided with openings having therein oilers communicating with a series of veins opening beneath the pulley on the opposite side of the shaft from the oiler, substantially as herein set forth.

2. The combination of the collar having therein threaded openings provided with oilers, the said collar secured in position upon the shaft by means of a set-screw, with the veins opening on the shaft on the opposite side from the oiler, with the shaft and pulley, the whole arranged as and for the purpose substantially as herein set forth.

In testimony that I claim the foregoing I have hereunto set my hand, this 11th day of October, 1884, in the presence of witnesses.

WILLIAM J. ORMSBY.

Witnesses:
 ALBERT PADDACK,
 L. H. PUMMILL.